Figure 1:
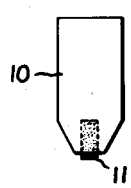

A. M. STANLEY.
WELDING PRESSURE CONTACT.
APPLICATION FILED JAN. 23, 1915.

1,176,614.

Patented Mar. 21, 1916.

Witnesses:

Inventor
Arthur M. Stanley.
by
His Attorney.

UNITED STATES PATENT OFFICE.

ARTHUR M. STANLEY, OF LYNN, MASSACHUSETTS, ASSIGNOR TO GENERAL ELECTRIC COMPANY, A CORPORATION OF NEW YORK.

WELDING PRESSURE-CONTACT.

1,176,614.   Specification of Letters Patent.   Patented Mar. 21, 1916.

Application filed January 23, 1915. Serial No. 3,946.

*To all whom it may concern:*

Be it known that I, ARTHUR M. STANLEY, a citizen of the United States, residing at Lynn, in the county of Essex, State of Massachusetts, have invented certain new and useful Improvements in Welding Pressure-Contacts, of which the following is a specification.

My invention has reference to electric welding by heating the surfaces of the objects to be welded by the passage of an electric current between them while they are in contact under pressure, as distinguished from welding by heating the surfaces of the objects by an electric arc formed between them and then contacting these surfaces under more or less pressure. The former process is generally spoken of as "resistance welding", because the welding heat is a function of the electrical resistance of a short portion of the objects back of the contacting surfaces, and of the transition resistance between the surfaces; while in the arc welding process the welding heat is almost entirely due to the arc formed between the surfaces.

There are two species of resistance welding, namely, butt welding and sheet welding. In butt welding, the two objects to be welded together are each tightly held in a clamp of very low resistance and high thermal conductivity and are brought into contact with moderate pressure, the current being supplied through the clamps, so that there is practically no resistance in the clamps and between each clamp and the respective welding object. The clamps are, therefore, not noticeably heated and impart no heat to the welding objects, the heat being developed solely in the welding objects at and near their contacting surfaces, and the clamps acting as current conveyers and heat dissipating means, so that the temperature of the welding objects back of the contacting surfaces is kept low. In sheet welding clamps cannot be conveniently employed and are generally not employed, and, in fact, the term "sheet welding" properly applies only to those cases where welding clamps are not employed. In these cases, as where two or more sheets are superimposed and welded together, face to face, the welding current is supplied to the sheets at the place where a weld is to be made by pressure contacts, the same as by the clamps in butt welding, with this difference, however, that whereas the clamps have a negligible resistance and a negligible transition resistance toward the welding objects, the pressure contacts being small in cross-section, have a noticeable resistance and a decided transition resistance toward the sheets.

My invention has reference to sheet welding and more particularly to the welding of sheets made of metals of low specific resistance and high thermal conductivity, such as copper, brass, aluminum and others.

Heretofore sheet welding on sheet-iron, sheet-steel and sheets of other metals of comparatively high specific resistance and low thermal conductivity has been accomplished with varying success with the use of copper pressure contacts, but it was found impossible to make successful sheet welds between copper, brass, and other like metals. The pressure contacts of copper were found to be useless when sheet-copper was attempted to be welded, because they tended to chill the sheets, which themselves are good conductors of heat, and to chill them to such an extent that with a moderate current the welding heat could not be imparted to the sheets, and when the current was raised the pressure contacts themselves became welded to the sheets.

I have found that in order to successfully weld sheet copper (which may here serve as the representative of low resistance and good heat conducting metals) it is necessary that the pressure contacts be of a material that has a considerably higher specific resistance than copper and that its ohmic resistance be sufficiently high that it may be heated by the current as much or more than the copper and then act as a barrier to heat conduction from the work; that it be a comparatively low conductor of heat for the same purpose; that it be more refractory than copper, so that it will not soften and become welded to the copper; and that it have considerable mechanical strength and not be noticeably deteriorated by exposure to air at the temperatures to which it is subjected. I have found all these characteristics combined in the metals tungsten and molybdenum, and by the use of either of them as pressure contacts I have been able to weld together sheets of copper and other metals of like properties safely and expeditiously, and without deterioration of the contacts after long continued use. It is not necessary that the whole body of the pressure contact piece be made of tungsten or molybdenum, since it is all sufficient that the contact proper be a short piece of tungsten or molybdenum carried by any other suitable metal, which latter may be considered as a backing or carrier of the pressure contact proper. All this will more fully appear from the following detail description with reference to the accompanying drawing, in which a number of the many possible forms in which my invention may be embodied are set forth and illustrated.

Figure 2:
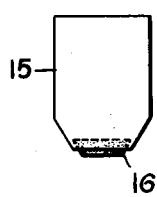
Figure 3:
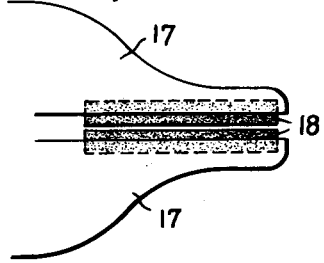
Figure 4:
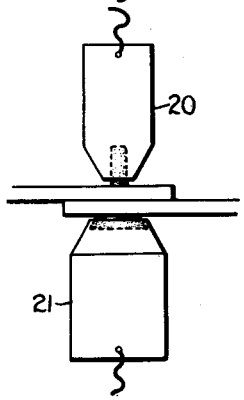
Figure 5:
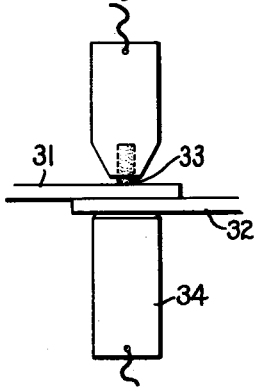
Figure 6:
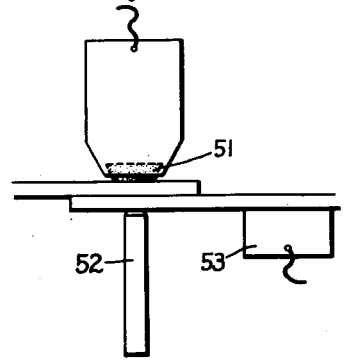
Figure 7:
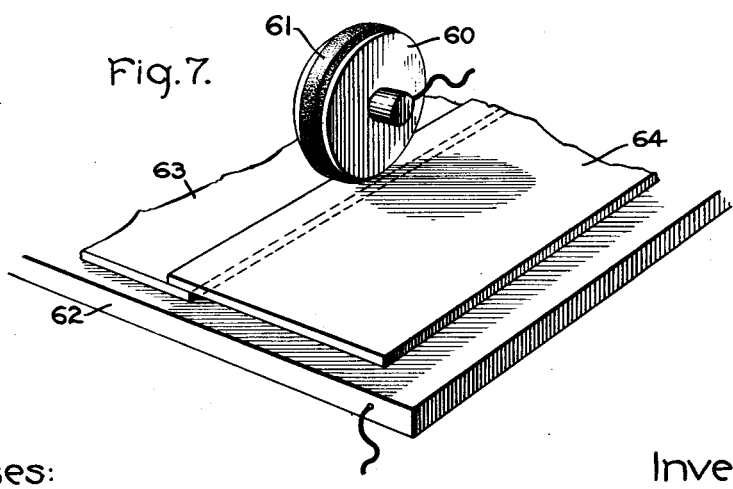

Figure 1 is a side elevation of a form of welding pressure contact made in accordance with my invention. Fig. 2 is a side elevation of another form of welding pressure contact. Fig. 3 is a side elevation of the jaws of a machine carrying another form of welding pressure contacts, also suitable for brazing. Figs. 4, 5, and 6 are views illustrating the application of my invention in welding two sheets together at a single spot at a time; and Fig. 7 is a perspective view illustrating the application of my invention to continuous line welding.

In Fig. 1 the contact support 10 is rather bulky and may be made of copper, but any other metal of sufficient bulk so as to have a small ohmic resistance may be used. In the end of this bulky piece of copper is inserted the welding pressure contact proper 11, and this is made of either molybdenum or tungsten, or of any other substance which has the hereinbefore described characteristics of molybdenum and tungsten. It is inserted in the piece 10 to a considerable depth so as to be well united with the same, and only a very short piece of it projects; and it is this short projecting piece of molybdenum or tungsten which serves as the welding pressure contact in accordance with my invention. Owing to its considerable mass, the carrier prevents the welding pressure contact proper from becoming overheated. The shape of the welding pressure contact is immaterial; it may be cylindrical or prismatic or have any other cross-section, but under all circumstances it must not project beyond the carrier 10 to any considerable length. I have found that if this piece projects about one eighth of an inch, it gives very satisfactory results under most conditions; while when it projects considerably more than one eighth of an inch it generally gets too hot and imparts too much heat to the sheets to be welded, which are then liable to be burned through. In Fig. 2 the construction shown is similar to that of Fig. 1 except that in this case the welding pressure contact 16 is in the form of a button having beveled edges inserted into a recess formed in the carrier 15, and the metal of the carrier is then spun over the bevel of the contact and thus firmly holds it in place. It will be understood that in both of these constructions, in fact, in all applications of my invention, the copper or other carrier of the welding pressure contact is not intended to come into contact with the sheets which are to be welded, as will appear farther on.

In Fig. 3 the welding pressure contacts 18 of molybdenum or tungsten are inserted in the faces of jaws 17 for a considerable length and may have any suitable width, either for welding sheets together over a considerable surface in one operation, or for brazing them together.

It will be understood that the structures shown in Figs. 1 and 2 are supposed to be parts of a welding machine; that the current is conducted primarily to the carriers 10 and 15; and that the sheets to be welded together are overlapped and the overlapped portion is inserted between two such structures as are shown in either Fig. 1 or Fig. 2, or between two structures like Fig. 1 and Fig. 2. In some cases only one of these structures is used and the other necessary pressure contact is supplied otherwise. Thus, a highly successful weld can be made by the arrangement shown in Fig. 4 in which one carrier and contact 20 is constructed like that shown in Fig. 1 and the other is constructed like that shown in Fig. 2. Welding by the use of two such pieces is known in the art as spot welding, the weld only occupying a surface equal to that of the smaller of the two welding pressure contacts. The welding operation usually takes about one quarter of a second of time so that in the practical operation of spot welding the two sheets which are to be welded together are usually placed upon one of the welding pressure contacts and the other welding pressure contact is quickly brought down upon the sheets in alinement with the other and is almost immediately thereafter withdrawn. This is the practical operation, which is well known in the art as spot welding of sheet iron. Usually and preferably one of the welding pressure contacts is broader than the other, since in this manner the work does not become perceptibly marred.

In Fig. 5 I have illustrated the welding of a sheet of copper 31 to a sheet of steel 32. In this case the welding pressure contact 33 which comes to bear upon the copper sheet must be either molybdenum or tungsten in accordance with my invention, while the pressure contact piece 34 upon which the sheet steel rests may be of copper.

In Fig. 6 I have illustrated an arrangement in which only one of the welding pressure contacts 51 is a terminal of the circuit that carries current to the work. The other terminal 53, is a block of any desired shape in contact with one of the sheets of the couple which is to be welded together, and 52 represents the plunger of a punch which presses the two sheets against the contact 51 and thus localizes the weld.

Fig. 7 illustrates my invention in its application to line welding. The roller 60 of copper or other good conductor has a slightly projecting rim 61 of molybdenum or tungsten which constitutes the welding pressure contact and two sheets 63, 64 of copper are supported upon a table 62 which constitutes one of the terminals, the roller 60 being the other terminal. As this roller is moved along the overlapping edges of the two sheets, current being supplied to the apparatus as indicated, a welded seam is formed expeditiously, the speed of the roller being gaged according to the current supplied and according to the thickness of the sheets.

It is quite practicable to weld together three or more superposed sheets of copper or other low resistance material if the rule is observed that the welding pressure contacts must project from the carrier to a greater distance as the number of superposed sheets increases; but under all circumstances the projection of the welding pressure contact must be very short, within the range of about one-eighth to one-fourth of an inch.

It should be understood that the constructions herein shown and described may be changed in form, size and proportions without deviating from my invention; and wherever in the appended claims the metal tungsten is recited, it is to be understood that the metal molybdenum is the equivalent of the same.

What I claim as new and desire to secure by Letters Patent of the United States, is:—

1. A sheet metal welding pressure contact having the described characteristics of tungsten and molybdenum.

2. A sheet metal welding pressure contact having the described characteristics of tungsten and molybdenum and a carrier for the same having low electrical resistance and large heat rediating surface.

3. A sheet metal welding pressure contact of refractory high resistance material which is only slightly affected by the oxygen of the air at high temperature, and a carrier for the same having low electrical resistance and large heat radiating surface.

4. A sheet metal welding pressure contact of tungsten.

5. A sheet metal welding pressure contact of tungsten and a carrier for the same having low electrical resistance and large heat radiating surface.

6. A sheet metal welding pressure contact of tungsten and a carrier for the same of copper having large heat radiating surface.

In witness whereof, I have hereunto set my hand this 22nd day of January, 1915.

ARTHUR M. STANLEY.

Witnesses:
   ALEX D. SALINGER,
   CHARLES E. HEYWOOD.